(12) United States Patent     (10) Patent No.:   US 12,572,122 B2

Chang     (45) Date of Patent:    Mar. 10, 2026

---

(54) BUILDING AI SMART MANAGEMENT SYSTEM

(71) Applicant: Chien-Jong Chang, Taipei (TW)

(72) Inventor: Chien-Jong Chang, Taipei (TW)

( * ) Notice: Subject to any disclaimer, the term of this patent is extended or adjusted under 35 U.S.C. 154(b) by 419 days.

(21) Appl. No.: 18/327,155

(22) Filed: Jun. 1, 2023

(65) Prior Publication Data

US 2024/0402668 A1    Dec. 5, 2024

(51) Int. Cl.
G05B 19/042     (2006.01)

(52) U.S. Cl.
CPC .... G05B 19/042 (2013.01); *G05B 2219/2642* (2013.01)

(58) Field of Classification Search
CPC ..................... G05B 19/042; G05B 2219/2642
See application file for complete search history.

(56) References Cited

U.S. PATENT DOCUMENTS

| | | | |
|---|---|---|---|
| 11,526,817 B1* | 12/2022 | Pacheco Mendez | .... G08G 5/22 |
| 2009/0300174 A1* | 12/2009 | Floris | ..................... G06Q 10/06 |
| | | | 715/764 |
| 2019/0209022 A1* | 7/2019 | Sobol | ..................... A61B 5/681 |
| 2021/0257085 A1* | 8/2021 | Arumugam | ............ G16H 40/20 |

OTHER PUBLICATIONS

Hasan et al. (Forat Falih Hasan and Muhamad Shahbani Abu Bakar, From Google Forms to Data Repository: A New Methodology in Data Collecting, Data Transforming, and Information Systems Evaluation, 2022, ISMSIT, pp. 710-714) (Year: 2022).*

* cited by examiner

*Primary Examiner* — Michael W Choi

(57) ABSTRACT

A building AI smart management system comprises a dashboard management module, a scheduling dashboard module, a statistics dashboard module, a data input report processing module, a data report output module, and a cross-platform link module, which are located on a server or a mobile device, wherein the server or the mobile device is electrically connected to the monitor.

8 Claims, 8 Drawing Sheets

BUILDING AI SMART MANAGEMENT SYSTEM

BACKGROUND OF THE INVENTION

Field of the Invention

The invention relates to a system, and more particularly to a system for building AI smart management.

The Prior Arts

In the property management work of the prior art, property events are managed separately through manual reports, and manual management and maintenance of equipment and meters of buildings are performed. It is not processed by the AI program. Unable to display the effect after integration. The property management work of the prior art is that the staff is small and the work is complicated, and the quality of the service often varies from person to person, and presents an unstable state.

SUMMARY OF THE INVENTION

The invention provides a building AI smart management system, which comprises a dashboard management module located on a server, which comprises an organizational management performance index module, a facility management performance index module, both of which combine at least one measurement index with corresponding evaluation methods, and calculate a score based on the execution results, which is displayed on a monitor; and a cloud smart device monitoring module connected to at least one sensor disposed within a building, which transmits at least one monitoring signal to the cloud smart device monitoring module and displays the monitoring signal on the monitor, wherein the organizational management performance index module, the facility management performance index module, and the cloud smart device monitoring module are respectively electrically connected to the monitor.

The building AI smart management system of the invention may further comprise a scheduling dashboard module located on the server, which allows various schedules within the building's annual management plan to be input through at least one scheduling log, so that an AI program is capable of determining the status of the at least one scheduling log, and displaying a warning on the monitor accordingly, wherein the status of the at least one scheduling log to be determined is whether a schedule is approaching its deadline, or whether a schedule has passed without being executed.

The building AI smart management system of the invention may further comprise a statistics dashboard module located on the server, which displays the statistical frequency of various service events within the building on the monitor, including at least one of: the number of public area maintenance items, counseling orders, social work visits, caring meal deliveries, emergency rescues, property management cares, community visits, and package mail receipts and deliveries.

The building AI smart management system of the invention may further comprise a data input report processing module located on the server, which processes AI smart management information, including a first digital data transmitted by the sensor and a first data generated by the server input, wherein the scope of the first data is clearly defined by manual pre-setting, and is entered daily into at least one database in Google Forms, and the AI program performs statistical analysis, status determination, string search, and corresponding AI domain applications on the at least one database.

The building AI smart management system of the invention may further comprise a data report output module located on the server, which creates a daily log database of the building's on-site management; wherein the AI program uses the string search function to search for keywords in the daily log database, collects the necessary data, and performs related statistical and regression analysis; and a cross-platform link module located on the server, which is a cross-platform AI smart management interface that automatically connects at least one management tool module to manage the data generated by the management tool module.

The invention further provides a building AI smart management system, which comprises a dashboard management module located on a mobile device, which comprises an organizational management performance index module, a facility management performance index module, both of which combine at least one measurement index with corresponding evaluation methods, and calculate a score based on the execution results, which is displayed on a monitor; and a cloud smart device monitoring module connected to at least one sensor disposed within a building, which transmits at least one monitoring signal to the cloud smart device monitoring module and displays the monitoring signal on the monitor, wherein the organizational management performance index module, the facility management performance index module, and the cloud smart device monitoring module are respectively electrically connected to the monitor.

The building AI smart management system of the invention may further comprises a scheduling dashboard module located on the mobile device, which allows various schedules within the building's annual management plan to be input through at least one scheduling log, so that an AI program is capable of determining the status of the at least one scheduling log, and displaying a warning on the monitor accordingly, wherein the status of the at least one scheduling log to be determined is whether a schedule is approaching its deadline, or whether a schedule has passed without being executed.

The building AI smart management system of the invention may further comprise a statistics dashboard module located on the mobile device, which displays the statistical frequency of various service events within the building on the monitor, including at least one of: the number of public area maintenance items, counseling orders, social work visits, caring meal deliveries, emergency rescues, property management cares, community visits, and package mail receipts and deliveries.

The building AI smart management system of the invention may further comprise a data input report processing module located on the mobile device, which processes AI smart management information, including a first digital data transmitted by the sensor and a first data generated by the server input, wherein the scope of the first data is clearly defined by manual pre-setting, and is entered daily into at least one database in Google Forms, and the AI program performs statistical analysis, status determination, string search, and corresponding AI domain applications on the at least one database.

The building AI smart management system of the invention may further comprise a data report output module located on the mobile device, which creates a daily log database of the building's on-site management; wherein the AI program uses the string search function to search for keywords in the daily log database, collects the necessary data, and performs related statistical and regression analysis; and a cross-platform link module located on the server, which is a cross-platform AI smart management interface that automatically connects at least one management tool module to manage the data generated by the management tool module.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

Figure 1:
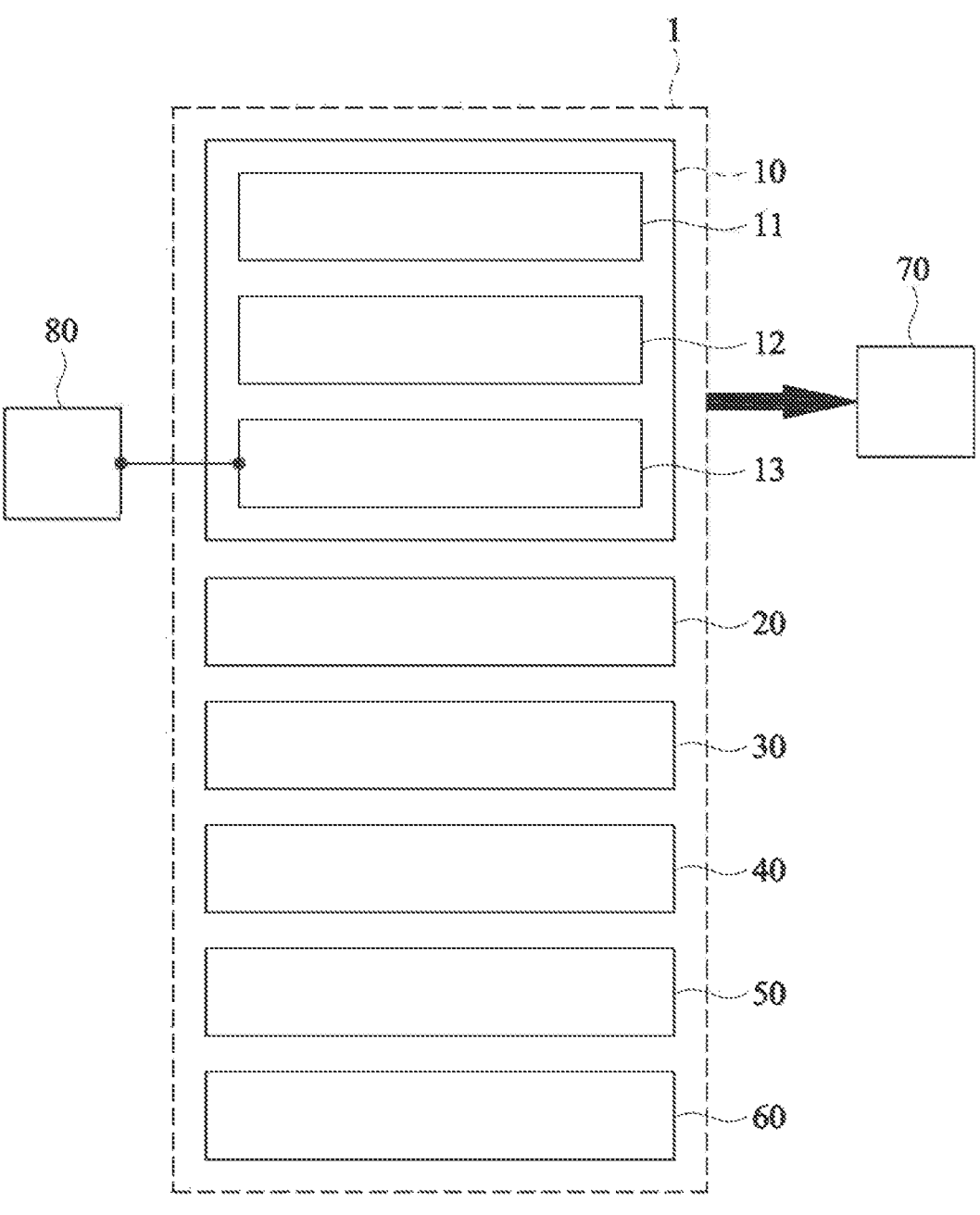
FIG. 1 is a schematic diagram of modules of a server of the building AI smart management system of the present invention.

As shown in FIG. 1, the present invention is a building AI smart management system, a schematic diagram of a module in a server 1. It has a dashboard management module 10, a scheduling dashboard module 20, a statistics dashboard module 30, a data input report processing module 40, a data report output module 50, and a cross-platform link module 60 located in the server 1, wherein the server 1 is connected to a monitor 70.

Figure 2:
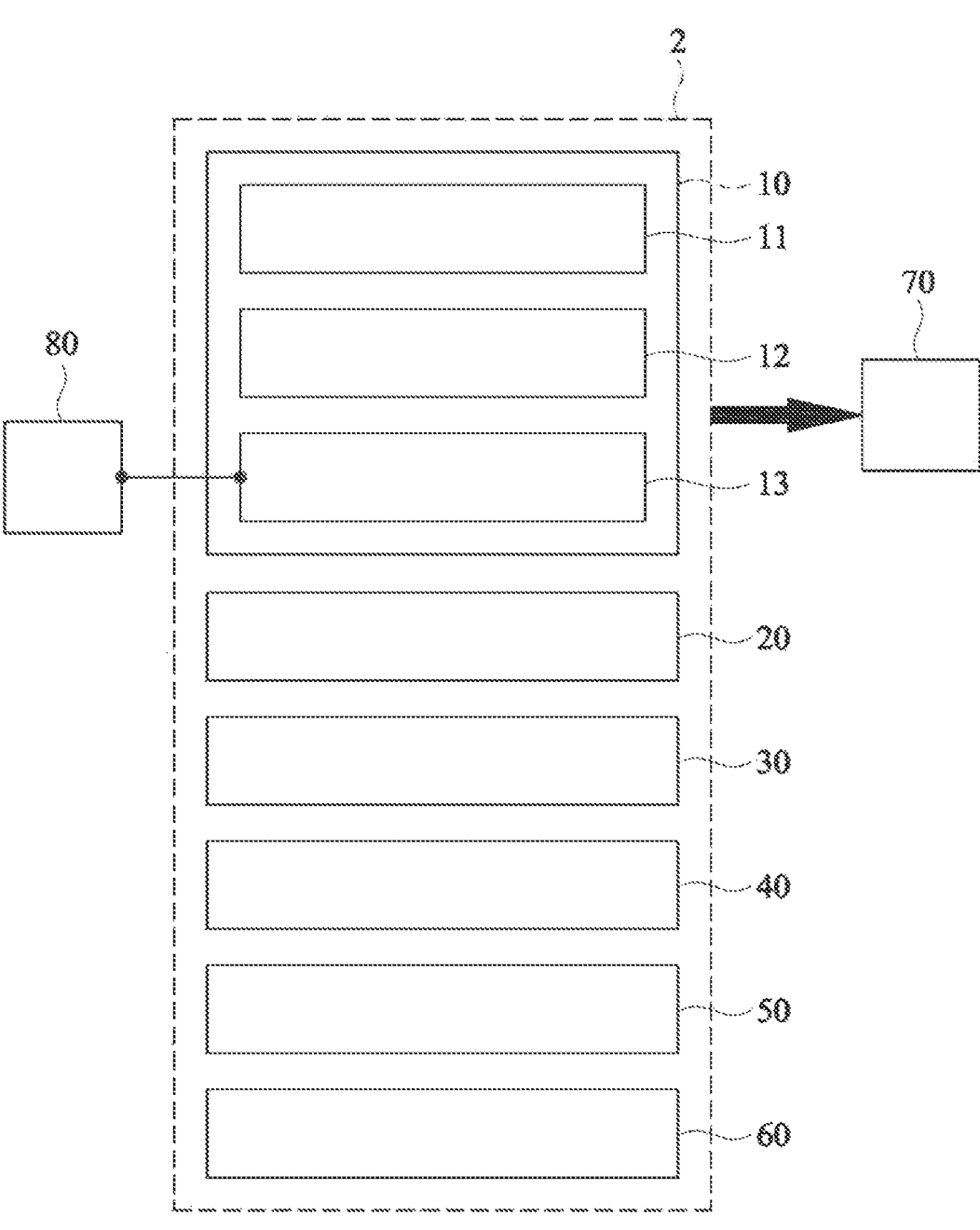
FIG. 2 is a schematic diagram of modules of a mobile device in the building AI smart management system of the present invention.

As shown in FIG. 2, the present invention is a building AI smart management system, a schematic diagram of a module on a mobile device 2. It has a dashboard management module 10, a scheduling dashboard module 20, a statistics dashboard module 30, a data input report processing module 40, a data report output module 50, and a cross-platform link module 60 located in the server 1, wherein the server 1 is connected to a monitor 70.

As shown in FIG. 1, the present invention is a building AI smart management system, which comprises: a building AI smart management system, including: a dashboard management module 10 located in a server 1, the dashboard management module 10 has an organizational management performance index module 11 and a facility management performance index module 12, where at least one measurement index is combined with the corresponding evaluation method to make a scoring result based on the number of execution results, and the scoring result displayed on a monitor 70, and a cloud smart device monitoring module 13, connected to at least one sensor of construction equipment in a building, the sensor returns at least one monitoring signal to the cloud smart device monitoring module 13, and the Monitoring signals are displayed on the monitor 70.

Figure 3:
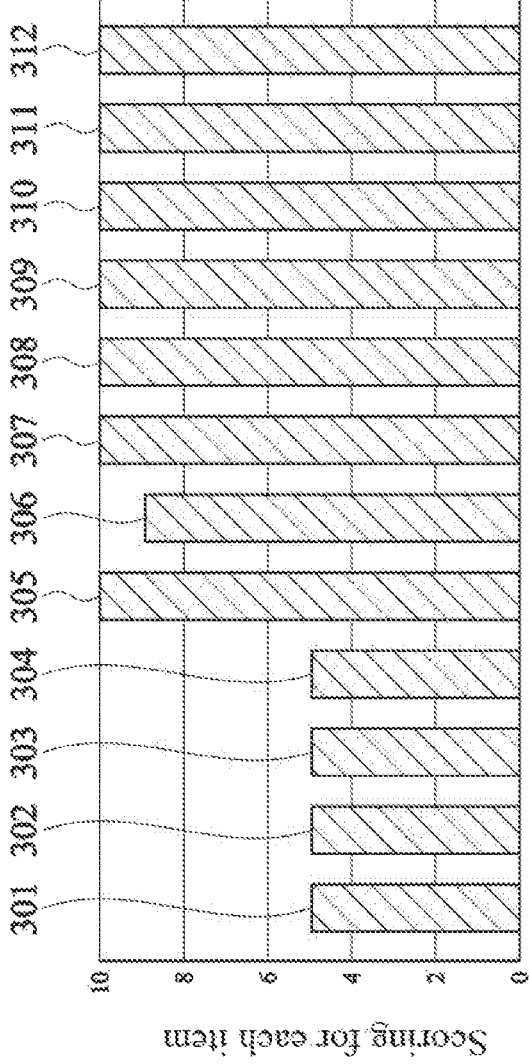
FIG. 3 is a schematic diagram of the organizational management performance index module of the dashboard management module of the present invention.
Figure 3:
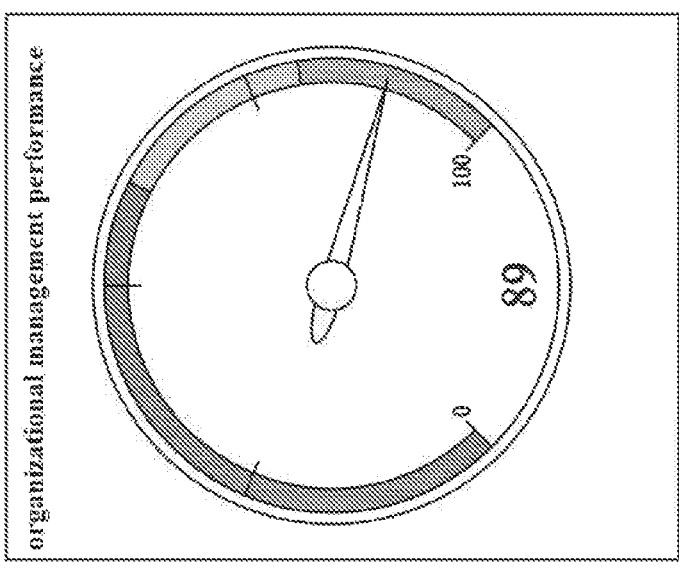

As shown in FIG. 3, the present invention is an AI intelligent management system for buildings, in which the organizational management performance index module 11 uses preset indicators to evaluate the actual score to represent the actual execution performance and evaluation content, such as Table 1:

TABLE 1

| Item | Metrics | Evaluation method | Execution Scenario | Scoring | Scored | Remarks |
|------|---------|-------------------|--------------------|---------|--------|---------|
| 1 | Number of Occupational Accidents | Count Occupational Accident Occurrence | Occupational Accident Occurrence ○ | 10 | | 0 occurrence get 10 points, one occurrence |
| 2 | Number of cases of business misappropriation | Statistics of business misappropriation cases | Occurrence of business misappropriation ○ cases | 10 | | deducts 2 points, and the maximum |
| 3 | Number of labor-management disputes | Count the number of labor-management disputes | Occurrence of labor-management disputes ○ | 10 | | 10 points. |
| 4 | Number of violations of the Gender Equality Act | Statistics of the number of violations of the Gender Equality Act | Occurrence of violations of the Gender Equality Act ○ | 10 | | |
| 5 | Number of Abnormal Absences Count | Statistics of the Number of Abnormal Absences | Occurrences of Abnormal Absences ○ | 10 | | |

TABLE 1-continued

| Item | Metrics | Evaluation method | Execution Scenario | Scoring | Scored | Remarks |
|---|---|---|---|---|---|---|
| 6 | On-site employee satisfaction survey | Total score/number of statistically returned questionnaires = average satisfaction | ○ points/○ copies of statistically returned questionnaires = average satisfaction | 10 | | 10 points for average satisfaction above 90, 9 for 89~85 84~80 points, 8 points, and so on. |
| 7 | Acquisition rate of property management professional certificates | Total Affairs management personnel, fire protection facility managers, equipment safety management personnel (number of licenses obtained/total number of staff and on-site supervisors) | Licenses obtained ○ pieces/staff and on-site supervisors ○ | 10 | | 0 points for not reached 1, 5 points for 1, 8 points for 2, 10 points for 3 |
| 8 | Average years of on-site supervisors | Total years of on-site supervisors/ Number of on-site supervisors | Total ○ years of on-site supervisors/On-site supervisors ○ | 10 | | 0 points for less than 1 year, 5 points for 1-3 years, 8 points for 3-5 years, 10 points for more than 5 years |
| 9 | Year resignation rate | The number of resigned employees in the whole year/ [the number at the beginning of the period + ½ (the number of new entrants in the whole year)] | the resigned ○ people in the whole year/ [the ○ people at the beginning of the period + ½ (the new entrants in the whole year)] | 10 | | Calculated in proportion |
| 10 | Retention rate of on-site personnel | 1. On-site supervisor (number of people with seniority of more than 6 months in the number of people at the end of the period/number of people with seniority of more than 6 months in the beginning of the period) | number of people with seniority of more than 6 months in the number of people at the end of the period ○/ number of people in 6 months ago ○ | 5 | | |
| | | 2. On-site administrative personnel (the number of people with seniority of more than 6 months in the number of people at the end of the period/ number of people in 6 | the number of people with seniority of more than 6 months in the number of people at the end of the period ○/the number of people 6 months ago ○ | 5 | | |

TABLE 1-continued

| Item | Metrics | Evaluation method | Execution Scenario | Scoring | Scored | Remarks |
|------|---------|-------------------|--------------------|---------|--------|---------|
| | | months ago) Total Score | | | | |

Wherein, as shown in FIG. 3, Items represent as Number of Occupational Accidents 301, Number of cases of business misappropriation 302, Number of labor-management disputes 303, Number of violations of the Gender Equality Act 304, Number of Abnormal Absences Count 305, On-site employee satisfaction survey 306, Acquisition rate of property management professional certificates 307, Average years of on-site supervisors 308, Year resignation rate 309, Retention rate of on-site personnel 310.

Figure 4:
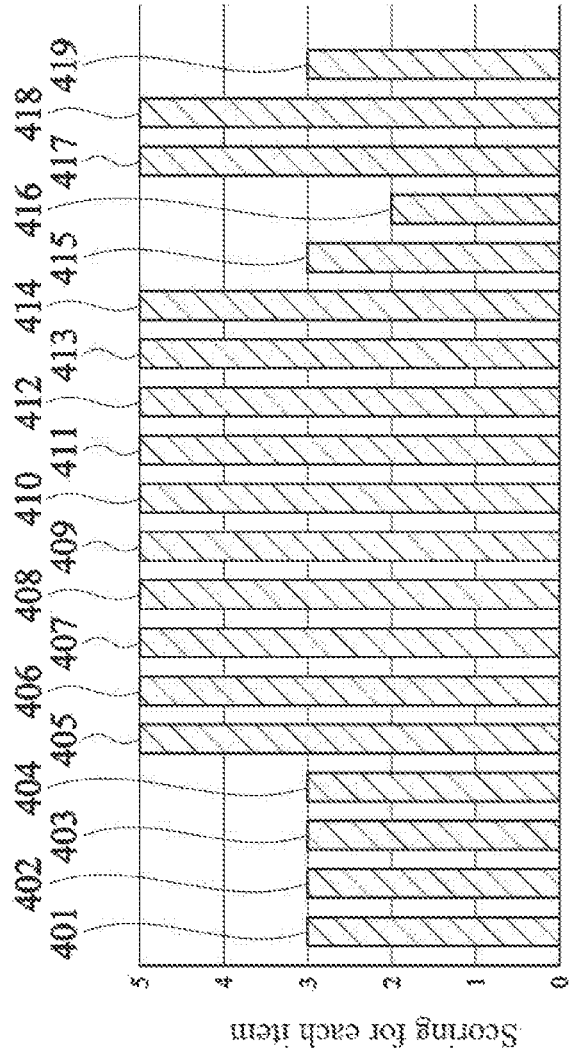
FIG. 4 is a schematic diagram of the facility management performance index module of the dashboard management module of the present invention.
Figure 4:
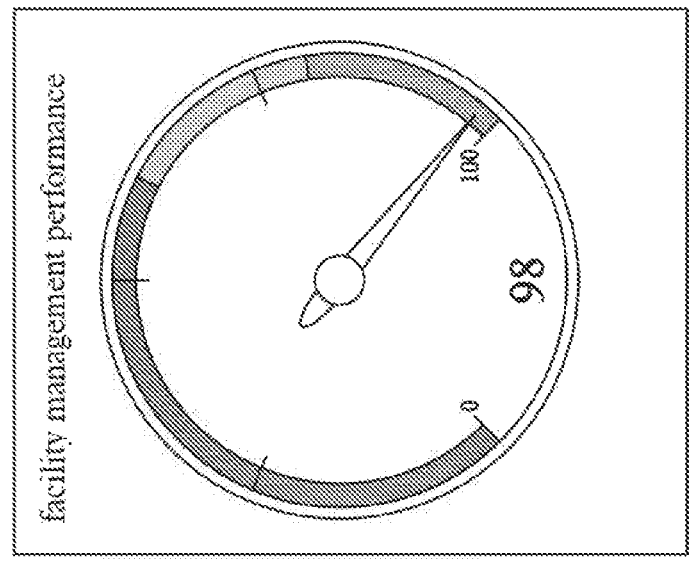

As shown in FIG. 4, the present invention is an AI intelligent management system for buildings, wherein the facility management performance index module 12 uses preset indicators to evaluate the actual score to represent the actual execution performance and evaluation content, such as Table 2:

TABLE 2

| Item | Measuring Index | Evaluation Method | Execution Description | Scoring | Scored | Remarks |
|------|-----------------|-------------------|-----------------------|---------|--------|---------|
| 1 | Qualification rate of stationed personnel | 1. Number of on-site supervisors, administrative personnel, and cleaning personnel/ number required by the contract | On-site supervisors ○ persons, administrative personnel ○ persons, cleaning personnel ○ persons/contract requirements ○ persons | 4 | | |
| | | 2. Number of security personnel/ Number of contract requirements | Security personnel ○ persons/Contract requirements ○ persons | 4 | | |
| 2 | Correct implementation rate of community registered letters | 1. Number of registered mails/Number of mails delivered by the post office | Registered ○ pieces/Delivered by the post office ○ pieces | 4 | | |
| | | 2. Number of lost pieces/ number of pieces delivered by the post office ○ | pieces lost/number of pieces delivered by the post office ○ pieces | 3 | | 3 points are awarded for none, and 3 points are deducted for one time. |
| 3 | Tenant Survey Satisfaction | Total scores/copies of statistically returned questionnaires = average satisfaction | Total ○ points/○ copies of statistically returned questionnaires = average satisfaction | 5 | | |
| 4 | Social housing service cloud application rate | Number of applicants/ total number of tenants | Applicants ○/ total tenants ○ | 4 | | |
| 5 | Registration of public property | construction of property inventory (number of established households/ total number of households) | establishment of ○ households/ total number of households ○) | 4 | | |
| 6 | The punctuality of pre-planning and | The punctuality of monthly data | Whether the monthly data is delivered on | 4 | | |

TABLE 2-continued

| Item | Measuring Index | Evaluation Method | Execution Description | Scoring | Scored | Remarks |
|---|---|---|---|---|---|---|
| | performance data | delivery | time or not yes/no | | | |
| 7 | Achievement rate of scheduled maintenance of public facilities and equipment | 1. Elevator maintenance times/annual scheduled maintenance times | Elevator maintenance ○ times/annual scheduled maintenance ○ times | 4 | | |
| | | 2. Generator maintenance times/annual scheduled maintenance times | Generator maintenance ○ times/annual scheduled maintenance ○ times | 4 | | |
| 8 | Qualification rate of public facilities and equipment inspection and filing | 1. Elevator use license | The effective date of the elevator use license: (dd/mm) | 4 | | |
| | | 2. Pass the fire inspection report | Yes/No pass the fire inspection report | 4 | | |
| | | 3. Public security inspection declaration is qualified | Public safety inspection declaration is/is not qualified | 4 | | |
| 9 | Evaluating the effectiveness of energy conservation | Last year's public electricity kwh-this year's public electricity kwh | Total last year's large public electricity ○ kwh-this year's large public electricity kwh | 3 | | 3 points for positive numbers and 0 points for negative numbers. More than 20% (now-go/go) should write a review report. |
| 10 | Drinking water tower water quality test | Inspection and test report meets the standard value | Inspection and test report is/is not in line with the standard | 3 | | |
| 11 | Achievement rate of cleaning and maintenance operations | Pool cleaning times/annual scheduled times | Pool cleaning ○ times/annual scheduled ○ times | 3 | | |
| 12 | Achievement rate of vector control | Implementation times/annual scheduled times | Implementation ○ times/annual scheduled ○ times | 3 | | |
| 13 | Incidence rate of theft | 1. Count the number of occurrences | Occurrence ○ | 3 | | 3 points for none, 3 points for one time. |
| | | 2. Abnormal analysis report after the theft | Abnormal analysis report after the theft | | | Each report +2 |
| | | 3. Specific improvement measures | Specific improvement measures | | | Each report +2 |
| 14 | Fire accident rate | 1. Count the number of incidents | Occurrence ○ | 4 | | 4 points for none, 4 points for one time. |
| | | 2. Abnormality analysis report after fire accident | Abnormality analysis report after fire accident | 2 | | No report-2 |
| | | 3. Specific improvement measures | Specific improvement measures | 2 | | No specific improvement-2 |

TABLE 2-continued

| Item | Measuring Index | Evaluation Method | Execution Description | Scoring | Scored | Remarks |
|---|---|---|---|---|---|---|
| 15 | Fire prevention and escape drill rate | Drill times/annual scheduled times | Drill ○ times/annual scheduled ○ times | 3 | | |
| 16 | Occurrence rate of other emergencies (such as: typhoon, earthquake, elevator failure, power failure, gas leakage) | 1. Check the emergency handling process | Yes/No Emergency handling process table | 5 | | |
| | | 2. Count the number of occurrences | Count the occurrence of ○times | 3 | | 3 points are awarded for none, and 3 points are deducted for one time. |
| | | 3. Abnormal analysis report after emergency accident | Abnormal analysis report after emergency accident | | | +2 for each report |
| | | 4. Specific improvement measures | Specific improvement measures | | | Each report +1 |
| 17 | Agency Requirements | Five categories of service work results | Whether it meets the requirements of work items | 5 | | 5 points if there is no missing, 1 point will be deducted for one item |
| | | Cooperate with contract performance and submit materials on time | Delay ○ times | 3 | | No missing 3 points, 1 point deduction for 1 delay |
| 18 | Good neighborliness | Cooperate with government agencies and neighborhood communities to handle activities | Number of times | | In addition to the activities stipulated by the agency, 1 point is awarded for each additional activity hosted | |
| 19 | The public complains about the manufacturer's service quality | 1. Major defects | Number of occurrences | 3 | | 3 points for none, 1 point deducted for one time. |
| | | 2. Occurrence frequency | Occurrence frequency | 3 | | 3 points for none, once a month on average, 1 point will be deducted; 2 times a month on average, 2 points will be deducted, and so on |
| | | 3. Specific improvement measures | Specific improvement measures | | | 1 point for each item |
| | | Total Score | | | | |

Wherein, as shown in FIG. 4, Items represent as Qualification rate of stationed personnel 401, Correct implementation rate of community registered letters 402, Tenant Satisfaction Survey 403, Social housing service cloud application rate 404, Registration of public property 405, The punctuality of pre-planning and performance data 406, Achievement rate of scheduled maintenance of public facilities and equipment 407, Qualification rate of public facilities and equipment inspection and filing 408, Evaluating the effectiveness of energy conservation 409, Drinking water tower water quality test 410, Achievement rate of cleaning and maintenance operations 411, Achievement rate of vector control 412, Incidence rate of theft 413, Fire accident rate 414, Fire prevention and escape drill rate 415, Occurrence rate of other emergencies (such as: typhoon, earthquake, elevator failure, power failure, gas leakage) 416, Agency Requirements 417, Good neighborliness 418, The public complains about the manufacturer's service quality 419.

Figure 5A:
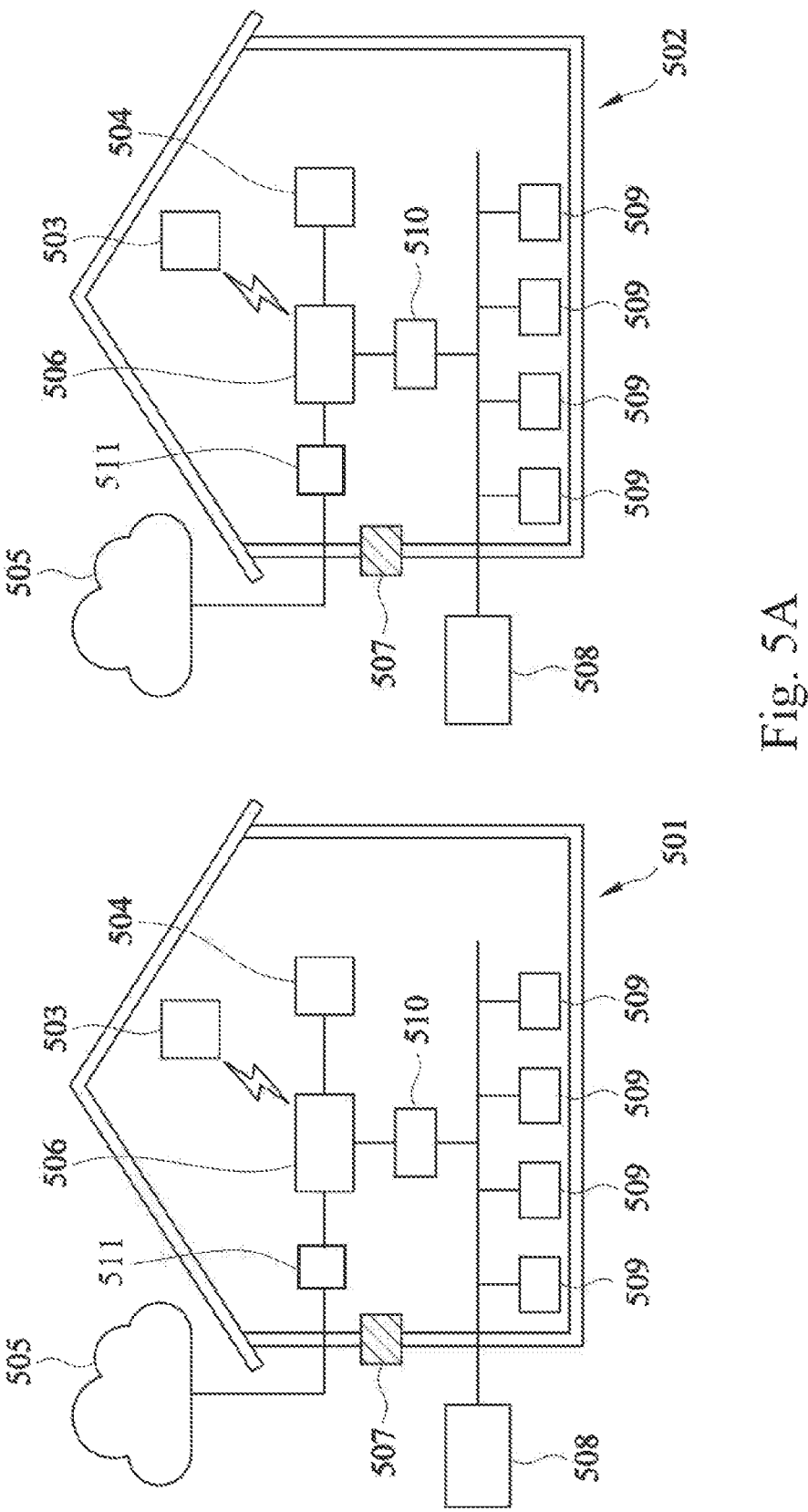
FIG. 5A is a schematic diagram of the cloud smart device monitoring module of the dashboard management module of the present invention.
Figure 5B:
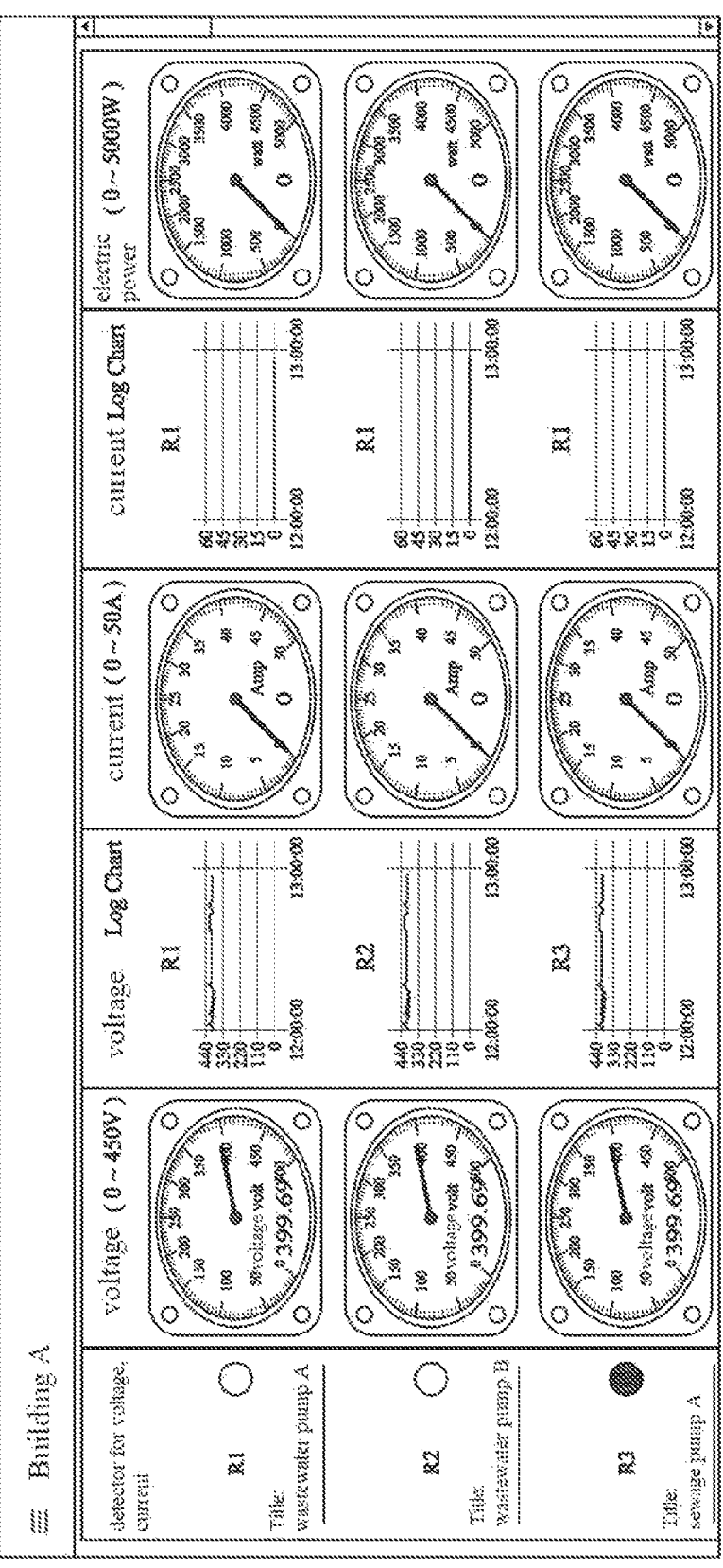
FIG. 5B is a schematic diagram of the digital signal sent back by the sensor of the present invention including the standby status, voltage value, current value, and power value of the sewage pump or wastewater pump.
Figure 5C:
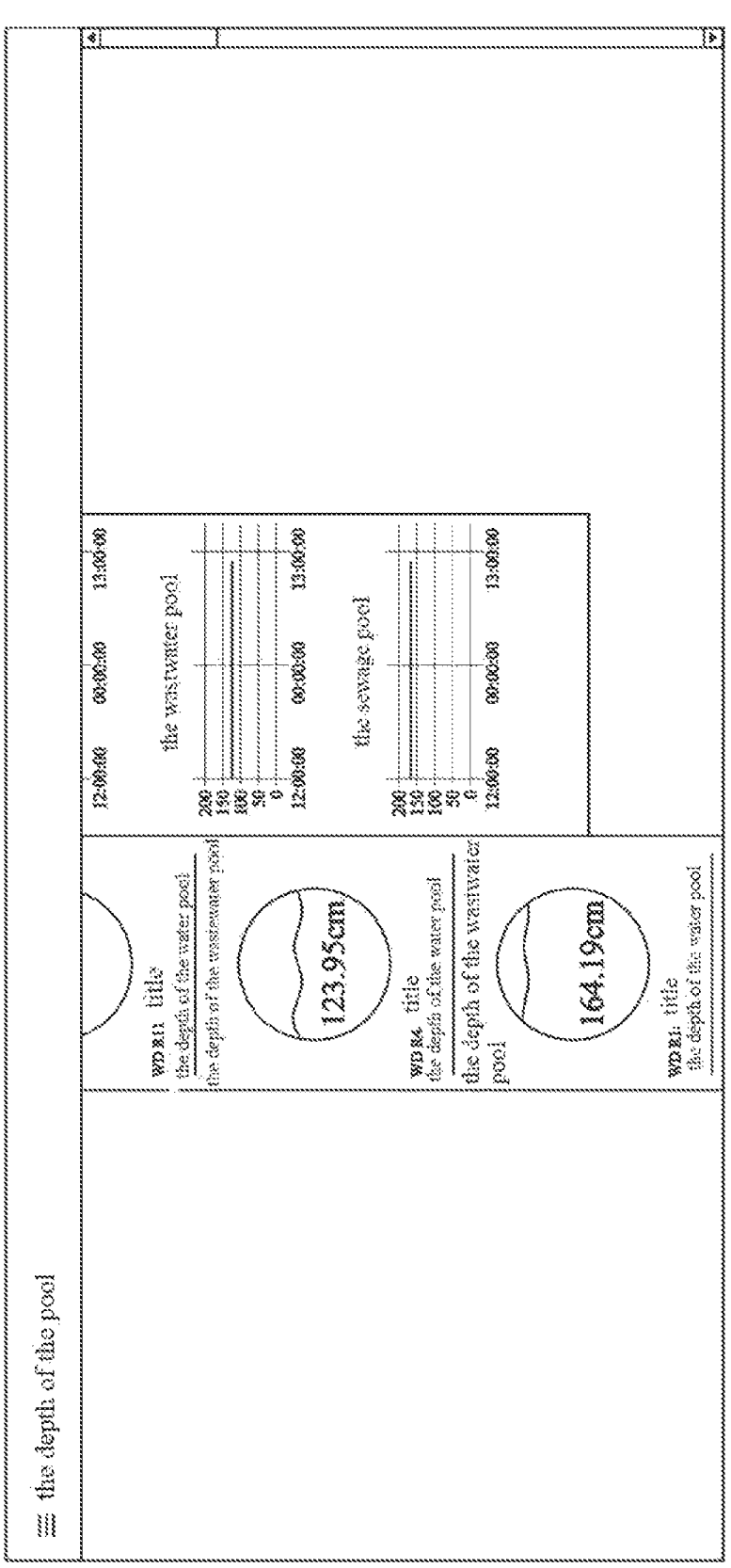
FIG. 5C is a schematic diagram of the digital signal sent back by the sensor of the present invention including the current depth of the sewage pool and the wastewater pool in Building A.
Figure 5D:
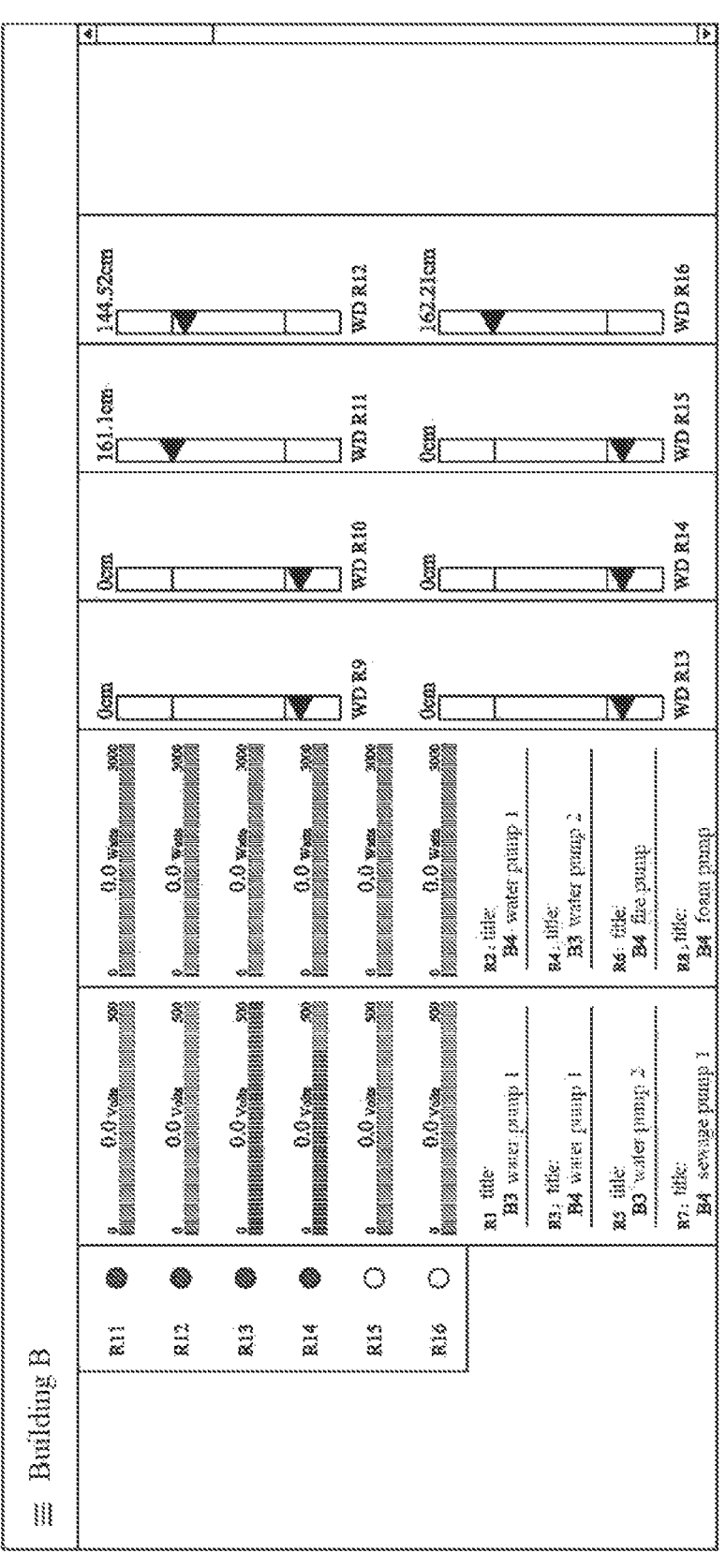
FIG. 5D is a schematic diagram of the digital signal sent back by the sensor of the present invention including the current, voltage, and power detected by the water pump, sewage pump, and wastewater pump of Building B, as well as the depth of the water pumping pool and the depth of the sewage pool.

As shown in FIG. 5A, the present invention is an AI intelligent management system for buildings, in which the cloud smart device monitoring module 13 can be connected to the digital signal sent back by the sensor to judge the operation status of the field equipment. As shown in FIG. 5B, for example, the standby status, voltage value, current value, and power value of a sewage pump or wastewater pump in a building. As shown in FIG. 5C, the current depths of the sewage pond and wastewater pond in building A. As shown in FIG. 5D, detected current, voltage, and electric power of the water pumps, sewage pumps, and wastewater pumps in building B. And the depth of the pumping pool and the depth of the sewage pool. As shown in FIG. 5A, Building A 501, Building B 502, WIFI CAMERA 503, LAN CAMERA 504, internet 505, WAN ROUTER 506, intercom 507, Public Switched Telephone Network, PSTN 508, TELEHPON 509, Exchange interface 510, FIBER-OPTIC COMMUNICATION 511.

The present invention is an AI intelligent management system for buildings further comprises a scheduling dashboard module 20, located in the server 1 or the mobile device 2, wherein various schedules in the building site management annual plan are input into the scheduling dashboard module 20 through at least one schedule log, and at least one status of the schedule log can be judged through an AI program, the schedule that is about to expire, or the schedule that is overdue execution of the schedule raises an alert on the monitor 70.

The AI intelligent management system for buildings of the present invention further comprises a statistics dashboard module 30 located on the server 1 or the mobile device 2, wherein the statistics dashboard module 30 displays the statistical frequency of various service events within the building on the monitor 70, including at least one of: the number of public area maintenance items, counseling orders, social work visits, caring meal deliveries, emergency rescues, property management cares, community visits, and package mail receipts and deliveries.

The building AI smart management system of the present invention further comprises a data input report processing module 40, which is located in the server 1 or the mobile device 2, wherein the data input report processing module 40 processes an AI smart management information, including: a first digital data, which is the digital data transmitted by the sensor 80, and a first data, which is the data generated by the input of the server 1, the first data generated by the input of the server 1, wherein the scope of the first data is clearly defined by manual pre-setting, and at least one database is formed by inputting a Google form every day, and the AI program is used to perform statistical analysis of the at least one database, judgment or determination of the status of the at least one database, string search of the at least one database, and corresponding AI domain application.

The building AI smart management system of the present invention further comprises a data report output module 50, located in the server 1 or the mobile device 2, the building A log database is formed from the work logs of the on-site management. Through the word string search function of the AI program, the keywords of the log database are searched, the required data are collected, and relevant statistical analysis and regression analysis are performed.

The building AI smart management system of the present invention further comprises a cross-platform link module 60, located in the server 1 or the mobile device 2, which is a cross-platform AI smart management interface. The platform is connected to at least one management tool module through management automation, so as to manage the data generated by the at least one management tool module.

The above descriptions and descriptions are only descriptions of the preferred embodiments of the present invention. Those who have common knowledge of this technology may make other modifications according to the scope of the patent application defined below and the above descriptions, but these modifications should still be It is for the creative spirit of the present invention and within the scope of rights of the present invention.

What is claimed is:

1. A building AI smart management system, comprising:
   a dashboard management module located on a server, which comprises an organizational management performance index module, and a facility management performance index module, both of which display performance index on a monitor;
   a cloud smart device monitoring module connected to at least one sensor disposed within a building, which transmits at least one monitoring signal to the cloud smart device monitoring module and displays the at least one monitoring signal on the monitor, wherein the organizational management performance index module, the facility management performance index module, and the cloud smart device monitoring module are respectively electrically connected to the monitor;
   a data input report processing module located on the server, which processes AI smart management information, including a first digital data transmitted by the at least one sensor; and a first data generated by an input of the server;
   wherein the scope of the first data is defined by manual pre-setting, and is entered daily into at least one database, and an AI program performs statistical analysis, status determination, string search, and corresponding AI domain applications on the at least one database;
   wherein the organizational management performance index module, including data items represent as number of occupational accidents, number of cases of business misappropriation, number of labor-management disputes, number of violations of the Gender Equality Act, number of abnormal absences count, on-site employee satisfaction survey, acquisition rate of property management professional certificates, average years of on-site supervisors, year resignation rate, and retention rate of on-site personnel;
   wherein the facility management performance index module, including items represent as qualification rate of stationed personnel, correct implementation rate of community registered letters, tenant satisfaction survey, social housing service cloud application rate, registration of public property, the punctuality of pre-planning and performance data, achievement rate of scheduled maintenance of public facilities and equipment, qualification rate of public facilities and equipment inspection and filing, evaluating the effectiveness of energy conservation, drinking water tower water quality test, achievement rate of cleaning and maintenance operations, achievement rate of vector control, incidence rate of theft, fire accident rate, fire prevention and escape drill rate, occurrence rate of other emergencies of typhoon, earthquake, elevator failure, power failure, or gas leakage, agency requirements, good neighborliness, and the public complains about the manufacturer's service quality.

2. The building AI smart management system according to claim 1, further comprising:

a scheduling dashboard module located on the server, which allows various schedules within the building's annual management plan to be input through at least one scheduling log, so that an AI program is capable of determining the status of the at least one scheduling log, and displaying a warning on the monitor accordingly, wherein the status of the at least one scheduling log to be determined is whether a schedule is approaching its deadline, or whether a schedule has passed without being executed.

3. The building AI smart management system according to claim 2, further comprising:

a statistics dashboard module located on the server, which displays the statistical frequency of various service events within the building on the monitor, including at least one of: the number of public area maintenance items, counseling orders, social work visits, caring meal deliveries, emergency rescues, property management cares, community visits, and package mail receipts and deliveries.

4. The building AI smart management system according to claim 1, further comprising:

a data report output module located on the server, which creates a daily log database of the building's on-site management; wherein the AI program uses the string search function to search for keywords in the daily log database, collects the necessary data, and performs related statistical and regression analysis; and a cross-platform link module located on the server, which is a cross-platform AI smart management interface that automatically connects at least one management tool module to manage the data generated by the management tool module.

5. A building AI smart management system, comprising:

a dashboard management module located on a mobile device, which comprises an organizational management performance index module, and a facility management performance index module, both of which display performance index on a monitor; and a cloud smart device monitoring module connected to at least one sensor disposed within a building, which transmits at least one monitoring signal to the cloud smart device monitoring module and displays the at least one monitoring signal on the monitor, wherein the organizational management performance index module, the facility management performance index module, and the cloud smart device monitoring module are respectively electrically connected to the monitor;

a data input report processing module located on the mobile device, which processes AI smart management information, including a first digital data transmitted by the at least one sensor and a first data generated by an input of the server, wherein the scope of the first data is defined by manual pre-setting, and is entered daily into at least one database, and an AI program performs statistical analysis, status determination, string search, and corresponding AI domain applications on the at least one database;

wherein the organizational management performance index module, including data items represent as number of occupational accidents, number of cases of business misappropriation, number of labor-management disputes, number of violations of the Gender Equality Act, number of abnormal absences count, on-site employee satisfaction survey, acquisition rate of property management professional certificates, average years of on-site supervisors, year resignation rate, and retention rate of on-site personnel;

wherein the facility management performance index module, including Items represent as qualification rate of stationed personnel, correct implementation rate of community registered letters, tenant satisfaction survey, social housing service cloud application rate, registration of public property, the punctuality of pre-planning and performance data, achievement rate of scheduled maintenance of public facilities and equipment, qualification rate of public facilities and equipment inspection and filing, evaluating the effectiveness of energy conservation, drinking water tower water quality test, achievement rate of cleaning and maintenance operations, achievement rate of vector control, incidence rate of theft, fire accident rate, fire prevention and escape drill rate, occurrence rate of other emergencies of typhoon, earthquake, elevator failure, power failure, or gas leakage, agency requirements, good neighborliness, and the public complains about the manufacturer's service quality.

6. The building AI smart management system according to claim 5, further comprising:

a scheduling dashboard module located on the mobile device, which allows various schedules within the building's annual management plan to be input through at least one scheduling log, so that an AI program is capable of determining the status of the at least one scheduling log, and displaying a warning on the monitor accordingly, wherein the status of the at least one scheduling log to be determined is whether a schedule is approaching its deadline, or whether a schedule has passed without being executed.

7. The building AI smart management system according to claim 6, further comprising:

a statistics dashboard module located on the mobile device, which displays the statistical frequency of various service events within the building on the monitor, including at least one of: the number of public area maintenance items, counseling orders, social work visits, caring meal deliveries, emergency rescues, property management cares, community visits, and package mail receipts and deliveries.

8. The building AI smart management system according to claim 5, further comprising:

a data report output module located on the mobile device, which creates a daily log database of the building's on-site management; wherein the AI program uses the string search function to search for keywords in the daily log database, collects the necessary data, and performs related statistical and regression analysis; and a cross-platform link module located on the server, which is a cross-platform AI smart management interface that automatically connects at least one management tool module to manage the data generated by the management tool module.

\* \* \* \* \*